(12) United States Patent
Mughal et al.

(10) Patent No.: US 6,411,122 B1
(45) Date of Patent: Jun. 25, 2002

(54) APPARATUS AND METHOD FOR DYNAMIC ON-DIE TERMINATION IN AN OPEN-DRAIN BUS ARCHITECTURE SYSTEM

(75) Inventors: Usman A. Mughal, Hillsboro, OR (US); Razi Uddin, Orangevale, CA (US); Chee How Lim, Hillsboro; Songmin Kim, Beaverton, both of OR (US); Steve Peterson, Shingle Springs, CA (US); Raghu P. Raman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/698,647

(22) Filed: Oct. 27, 2000

(51) Int. Cl.[7] ............................................. H03K 17/16

(52) U.S. Cl. .............................. 326/30; 326/86; 326/90; 326/21; 710/101

(58) Field of Search ............................... 326/30, 86, 83, 326/90, 93, 56, 57; 327/108, 437, 319

(56) References Cited

U.S. PATENT DOCUMENTS

| 5,528,168 A | * | 6/1996 | Kleveland | 326/30 |
| 5,781,028 A | * | 7/1998 | Decuir | 326/30 |
| 5,793,223 A | * | 8/1998 | Frankeny | 326/30 |
| 6,026,456 A | * | 2/2000 | Ilkbahar | 710/101 |
| 6,127,840 A | * | 10/2000 | Coteus et al. | 326/30 |

* cited by examiner

Primary Examiner—Michael Tokar
Assistant Examiner—Vibol Tan
(74) Attorney, Agent, or Firm—Blakely, Sokoloff, Taylor & Zafman LLP

(57) ABSTRACT

In a system, such as an open-drain bus architecture system, a termination impedance can be dynamically coupled or de-coupled from a bus. The termination impedance is coupled to the bus by a dynamic control circuit if a signal is being received from the bus or if a binary 1 is driven on the bus. The termination impedance is de-coupled from the bus by the dynamic control circuit if a binary 0 is driven on the bus. Coupling the termination impedance to the bus improves signal quality by providing a matching impedance. De-coupling the termination impedance reduces power dissipation and improves receiver noise margin.

38 Claims, 2 Drawing Sheets

APPARATUS AND METHOD FOR DYNAMIC ON-DIE TERMINATION IN AN OPEN-DRAIN BUS ARCHITECTURE SYSTEM

BACKGROUND OF THE INVENTION

1. Field of the Invention

The present invention generally relates to electronic devices, and in particular, relates to circuitry that provides dynamic termination for a bus, such as those in open-drain bus architecture systems.

2. Background Information

Operating frequencies of processors are progressively increasing. In order to take advantage of these high frequencies, computer systems attempt to transmit signals along their buses and between system components at comparable frequencies.

When transmitting and receiving data at high frequencies between system components, such as between semiconductor components, some problems are encountered. Buses behave like transmission lines, where impedance mismatches lead to signal reflection and interference effects, such as ring-backs and overshoots. Maintaining signal quality over interconnections thus typically require termination of the transmission lines (e.g., buses) with matching impedances to minimize signal reflections.

With what is sometimes referred to as "dual-ended termination," transmission lines used to carry signals in both directions are terminated at both ends (e.g., at agents at each end), such that a terminating resistor matches a characteristic impedance of the transmission line. However, having the termination resistor at the driving end of the transmission line needlessly dissipates power, particularly when a low voltage level (e.g., a binary 0) is driven onto the transmission line, since a current flows through the termination resistor at that driving end. Attempts to avoid this power dissipation include system architectures that provide a termination resistor on only one side of the transmission line (sometimes referred to as "single-ended termination"), but such single-ended termination architectures result in a positive reflection coefficient at the un-terminated end of the transmission line, which is an adverse result for a high-performance and high-frequency bus.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an apparatus and method for providing dynamic termination in a bus system are described herein. In the following description, numerous specific details are provided, such as the description of some system components in FIG. 1, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides a way to dynamically couple and de-couple a termination impedance to a bus. When a device is receiving data from the bus or is transmitting high signal levels (e.g., binary 1s), the termination impedance is coupled to the bus. When the device is transmitting low signal levels (e.g., binary 0s) the termination impedance is de-coupled from the bus. This dynamic termination reduces power dissipation and also improves receiver noise margin, as will be described later below.

Figure 1:
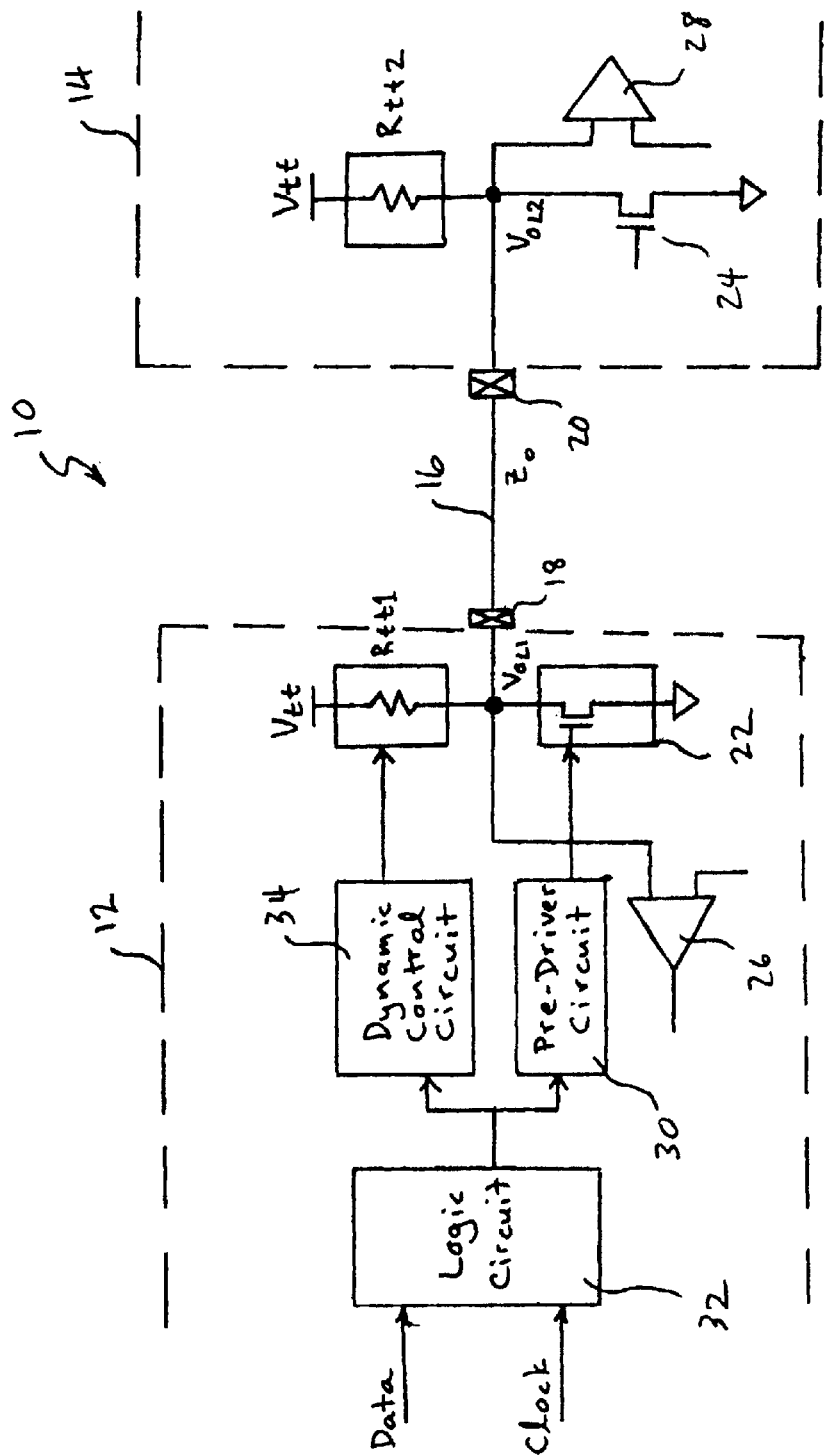
FIG. 1 is a block diagram showing an implementation of an embodiment of the invention.

Referring first to FIG. 1, shown generally at 10 is a system that can implement an embodiment of the invention. The system 10 includes a plurality of devices 12 and 14 that can communicate with each other via one or more buses 16. Examples of the devices 12 and 14 can include chipsets, die(s), input/output (I/O) buffers, network cards, processors, etc.

In an embodiment, the system 10 can have an architecture such as an open drain bus architecture (ODBA). The bus 16 can be, for example in one embodiment, a Gunning Transceiver Logic (GTL) bus or a GTL+bus or other GTL-type bus, and it is understood that an embodiment of the invention may be implemented with other types of buses. Therefore, the present invention is not necessarily limited to ODBA systems or to any particular type of bus.

In the example shown in FIG. 1, the system 10 is that of a dual-ended termination ODBA system. That is, each of the devices 12 and 14 include termination impedances, which according to an embodiment may be in the form of on-die termination resistors $R_{tt1}$ and $R_{tt2}$, respectively, that are coupleable to each end of the bus 16. In another embodiment, the termination resistors $R_{tt1}$, and $R_{tt2}$, can be off-die. The termination resistors $R_{tt1}$ and $R_{tt2}$ have impedances that are substantially matched with a characteristic impedance $Z_0$ of the bus 16. The termination resistor $R_{tt1}$ is coupleable between a voltage source $V_{tt}$ and a node (e.g., a pad 18) having an output-low voltage $V_{OL1}$. The termination resistor $R_{tt2}$ is coupleable between the voltage source $V_{tt}$ and a pad 20 having an output-low voltage $V_{OL2}$. The bus 16 is connected to the devices 12 and 14 via the pads 18 and 20.

As a person skilled in the art will appreciate, an ODBA system such as the system 10 includes (for the device 12), a pull-down transistor 22 having a drain terminal coupled to the pad 18 and a source terminal coupled to ground. The device 14 has a pull-down transistor 24 having a drain terminal coupled to the pad 20 and a source terminal coupled to ground. According to one embodiment, the transistors 22 and 24 can comprise N-channel metal oxide semiconductor (NMOS) transistors or similar transistors.

The devices 12 and 14 further include receivers 26 and 28, respectively, to detect signals on the bus 16 and which may comprise comparators or amplifiers. The transistors 22 and 24, their associated drivers, and the receivers 26 and 28 together can form parts of devices such as processors, chipset logic to communicate between processors and the rest of the system 10, cluster logic to communicate between clusters of processors, I/O buffer circuitry, etc.

In accordance with one embodiment of the invention, the device 12 includes a pre-driver (or driver) circuit 30 coupled to a gate terminal of the transistor 22. The pre-driver circuit 30 receives its input(s) from output(s) of a logic circuit 32. The logic circuit 32 comprises sequential and combinational logic, such as those that are known in the art for ODBA systems, having a data signal and a clock signal as inputs. In one embodiment, the pre-driver circuit 30 includes an inverter having an output coupled to the gate terminal of the transistor 22. Thus, for example for a transmit mode of operation, low signal levels (e.g., binary 0s) of the data signal are converted by the inverter of the pre-driver circuit 30 into high signal levels (e.g., binary 1s) that turn on the transistor 22. The turning on of the transistor 22 "pulls down" the pad 18 to a low voltage state. In contrast, high signal levels (e.g., binary 1s) of the data signal are converted by the inverter of the pre-driver circuit 30 into low signal levels (e.g., binary 0s) that turn off the transistor 22, resulting in a "pull up" of the pad 18 to a high voltage state via the termination resistor $R_{tt1}$ and the voltage source $V_{tt}$.

In an embodiment of the invention, the device 12 includes a dynamic control circuit 34 to dynamically "turn on" or "turn off" the termination resistor $R_{tt1}$. That is, when the device 12 is transmitting low level binary 0s on the bus 16, the termination resistor $R_{tt1}$ is turned off or de-coupled by the dynamic control circuit 34. As a result, the termination resistor $R_{tt1}$ does not draw current and dissipate power while low voltage/signal levels are driven on to the bus 16 at the pad 18. Thus, power is saved in the transmit mode of operation, when the termination resistor $R_{tt1}$ is not needed for driving a low voltage levels.

In an embodiment, the dynamic control circuit 34 turns on or couples the termination resistor $R_{tt1}$ to the pad 18, when the device 12 drives or transmits high voltage levels on the bus 16 at the pad 18. This allows current to flow through the termination resistor $R_{tt1}$ and pulls the pad 18 to a high voltage state, since the transistor 22 is turned off at this time. The dynamic control circuit 34 can thereafter keep the termination resistor $R_{tt1}$ turned on if no low voltage levels are subsequently transmitted. If the device 12 is receiving data or an external signal via the bus 16 from the device 14, the dynamic control circuit 34 can turn on the termination resistor $R_{tt1}$ to provide a matching termination impedance. Turning on the termination resistor $R_{tt1}$ thus provides matching termination that suppresses overshoots and residual noises on the bus 16, and also improves signal quality, timing, and device reliability.

It is noted that placement of the dynamic control circuit 34 on the device 12, to control coupling/de-coupling of the termination resistor $R_{tt1}$ is merely an illustrative example. Other dynamic control circuits 34 can be placed on the device 14 to control coupling/de-coupling of the termination resistor $R_{tt1}$ or placed on other devices coupled to the bus 16. Furthermore, although the device 14 is shown as having the termination resistor $R_{tt1}$ the device 14 or other devices of the system 10 may not necessarily have termination resistors (e.g., some devices of the system 10 may be connected using single-ended termination ODBA architectures). As such, the number and placement of the various dynamic control circuit(s) 34 can be designed, for example, so as to optimize signal transmission/reception performance when the different devices of the system 10 are communicating with each other, and when one or more of these devices may not have termination impedances. The present invention is not limited by the number or placement of the dynamic control circuit(s) 34 on any specific device of the system 10.

In an embodiment, the dynamic control circuit 34 can be governed by latched input data controls from the logic circuit 32. Several possible circuit or logic configurations may be used for the dynamic control circuit 34 to control switching activity of the termination resistor $R_{tt1}$ some of which are shown in FIGS. 2–4 for illustrative purposes.

Figures 2, 3, 4:
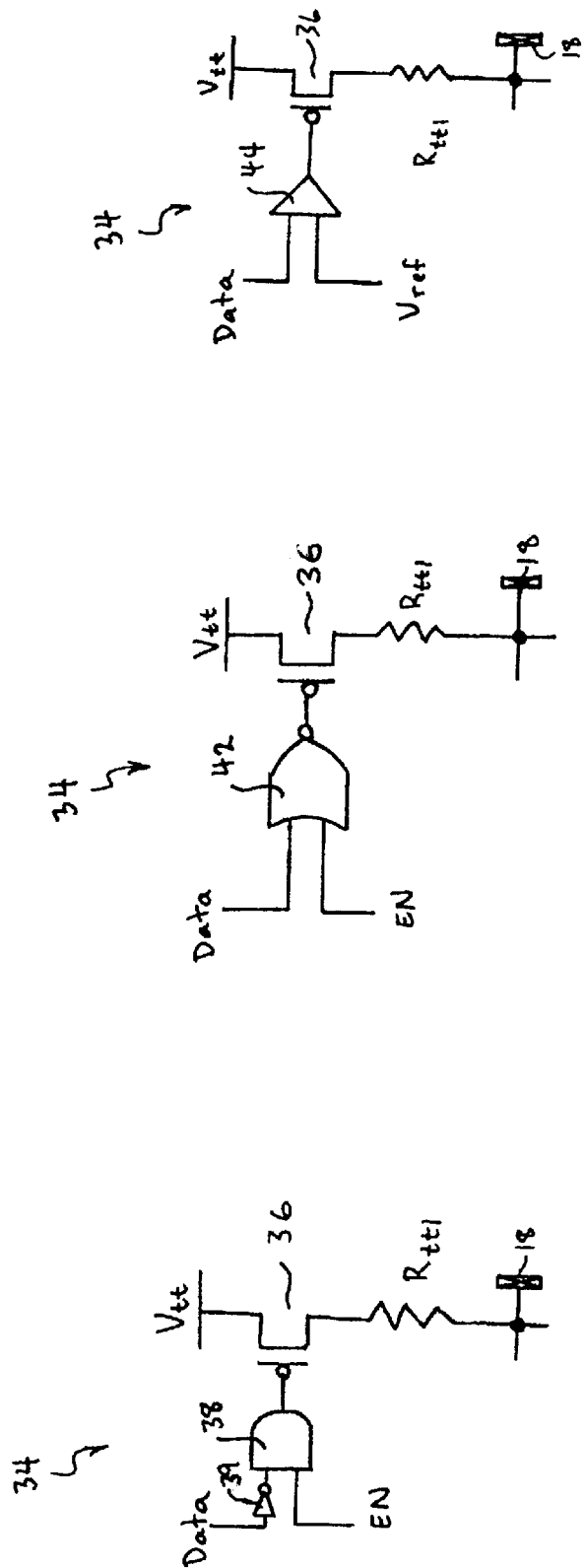
FIG. 2 is a schematic diagram of an embodiment of a dynamic termination control circuit that can be used in the implementation shown in FIG. 1.
FIG. 3 is a schematic diagram of an embodiment of a dynamic termination control circuit that can be used in the implementation shown in FIG. 1.
FIG. 4 is a schematic diagram of an embodiment of a dynamic termination control circuit that can be used in the implementation shown in FIG. 1.

For example in FIG. 2, terminals of a switching P-channel MOS or PMOS transistor 36 can be coupled in series with the termination resistor $R_{tt1}$. A gate terminal of the PMOS transistor 36 is coupled to an output of a digital circuit, such as an AND gate 38. Inputs of the AND gate 38 include the data signal (which is pre-inverted by an inverter 39) and an enable signal EN.

During an example of a transmit mode of operation, when the device 12 is driving a signal on to the bus 16, the enable signal EN can be high (e.g., a binary 1 provided from the logic circuit 32). If the data signal has a binary 1, the inverter of the pre-driver circuit 30 of FIG. 1 inverts this binary 1 to a binary 0 to turn off the transistor 22. The binary 1 of the data signal is also inverted to a binary 0 by the inverter 39, prior to being input into the AND gate 38. Thus, the binary 0(from the inverted data signal) and the binary 1 (from the enable signal EN) inputs of the AND gate 38 produce a binary 0 output that turns on the PMOS transistor 36. With this switch closed in this manner, the voltage at the pad 18 is pulled high by the connected termination resistor $R_{tt1}$.

If the data signal has a binary 0 during the transmit mode of operation, the inverter of the pre-driver circuit 30 of FIG. 1 inverts the binary 0 to a binary 1 to turn on the transistor 22. For the dynamic control circuit 34, the binary 0 of the data signal is inverted to a binary 1 by the inverter 39, prior to being input into the AND gate 38. Thus, the binary 1 (from the inverted data signal) and the binary 1 (from the enable signal EN) inputs of the AND gate 38 produce a binary 1 output that turns off the PMOS transistor 36. With the switch open in this manner, the termination resistor $R_{tt1}$ is de-coupled from the circuit, and the voltage at the pad 18 is pulled low by the transistor 22.

During an example of a receive mode of operation, when the device 12 is receiving a signal from the bus 16, the enable signal EN can be low (e.g., a binary 0 provided from the logic circuit 32), with the resulting output of the AND gate 38 being a binary 1 that turns on the PMOS transistor 36. The turning on of the PMOS transistor 36 closes the switch and couples the termination resistor $R_{tt1}$ into the circuit.

FIG. 3 shows another example of the dynamic control circuit 34, where the NAND gate 38 is replaced by a NOR gate 42 and the data signal is not inverted prior to being input into the NOR gate 42. If the enable signal is a binary 0 during the transmit mode of operation, the output of the NOR gate 42 will be the inverted data signal, to turn the PMOS transistor on or off. The other logic described above for the embodiment of FIG. 2 is applicable to the embodiment of FIG. 3, and therefore will not be described in further detail herein for the sake of simplicity.

FIG. 4 shows another example of the dynamic control circuit 34, where the AND gate 38 of FIG. 2 is replaced by a comparator circuit 44. The comparator circuit 44 can have the data signal and a reference voltage $V_{ref}$ as inputs, and an output coupled to the gate terminal of the transistor 36. The reference voltage $V_{ref}$ can be set at a level between a binary 1 and a binary 0. Thus, when in the receive mode of operation or when transmitting a binary 1 during the transmit mode of operation, the data signal input into the comparator circuit 44 is higher than (or equal to) the reference voltage $V_{ref}$. This results in the comparator circuit 44 outputting a binary 0 that turns on the PMOS transistor 36, thereby closing the switch and coupling the termination resistor $R_{tr1}$ to the circuit. When the data signal is a binary 0, the data signal input into the comparator circuit 44 falls below the reference voltage $V_{ref}$ resulting in the comparator circuit 44 changing state and outputting a binary 1 that turns off the PMOS transistor 36. This de-couples the termination resistor $R_{tr1}$ from the circuit.

In another embodiment, an inverter circuit having the data signal as an input can be used instead of the comparator circuit 44. Numerous other variations to the dynamic control circuit 34 shown in FIGS. 2–4 are possible, such as use of a NAND gate, or any suitable combination/configuration of inverters and logic circuits/gates that can trigger the switching on or off of the PMOS transistor 36. Such logic can be designed based on the whether high or low signals are to be driven on the bus 16, based on whether the device 12 is in receive/transmit modes of operation, and/or based on the particular binary 1 or binary 0 states of the various signals propagating through the dynamic control circuit 34, for example.

In conclusion, an embodiment of the invention reduces power dissipation by dynamically coupling or de-coupling a termination impedance, such as the termination resistor $R_{tr1}$. The termination resistor $R_{tr1}$ is "turned on" when receiving data or driving a high signal level on to the bus 16. The termination resistor $R_{tr1}$ is "turned off" when driving a low signal level on to the bus 16.

A difference between one embodiment of the invention and existing circuitry of ODBA systems is that the embodiment of the invention provides improved receiver noise margin. In existing dual-ended termination ODBA systems, the direct current (DC) level of an output-low voltage $V_{OL}$ undesirably rises due to a smaller effective pull-up. The two termination resistors of existing ODBA systems also act undesirably as clamping circuits for any residual noises, especially when no data is being driven on to the bus.

An embodiment of the invention addresses the issue of high pad $V_{OL}$ when a bus is terminated at both ends. $V_{OL}$ is determined through simple voltage division by a pull-down resistance $R_{ON}$ of the transistor 22 (e.g., resistance across the drain and source terminals of the transistor 22 when the transistor 22 is on) and by the termination resistor $R_{tr1}$. Because the termination resistor $R_{tr1}$ is turned off when driving a low voltage level, $V_{OL1}$ obtained through voltage division lowers. This lower $V_{OL1}$ provides a larger voltage swing at the pad 18 and keeps noise away from the threshold voltage of the receiver 28 of the device 14. This improves the receiver's 28 noise margin.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For instance, while specific examples of logic and other circuitry are shown in FIGS. 2–4 for the dynamic control circuit 34, it is to be appreciated that other circuit embodiments may be implemented to dynamically couple/de-couple the termination resistor(s). Furthermore, the switch to couple or de-couple the termination resistor(s) need not necessarily be a transistor coupled in series with the termination resistor(s) as shown in FIGS. 2–4. In one embodiment, for example, the termination resistor(s) may be voltage controlled resistor(s) whose resistance varies between $Z_0$ and a higher impedance, such that it effectively acts as an open circuit element when low voltage levels are driven on the bus 16.

As another example, an embodiment of the invention can be implemented using software or other instructions stored on a machine-readable storage medium. That is, for instance, at least some of the components of the device 12 can disposed on a programmable circuit, programmable logic circuit, programmable logic device, etc., such that the software can trigger/control the coupling and de-coupling of the termination resistor $R_{tr1}$.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a termination impedance; and
   a control circuit to couple the termination impedance between a voltage source and a node if a voltage at the node is at a first level, the control circuit being capable to de-couple the termination impedance between the voltage source and the node if the voltage at the node is at a second level lower than the first level, wherein the termination impedance and the control circuit are disposed on a same die, wherein the control circuit comprises:
   a switch coupled in series with the termination impedance; and
   a digital circuit having an output terminal coupled to the switch to close or open the switch based on at least one input signal to the digital circuit.

2. The apparatus of claim 1 wherein the control circuit is capable to couple the termination impedance between the voltage source and the node if an external signal is received at the node in a receive mode of operation.

3. The apparatus of claim 1 wherein the termination impedance comprises a resistor having a resistance substantially matched with an impedance of a bus coupleable to the node.

4. The apparatus of claim 1, further comprising:
   a transistor having a first terminal coupled to the node, a second terminal coupled to ground, and a third terminal; and
   a driver circuit having an output terminal coupled to the third terminal of the transistor, the driver circuit being coupled to turn on the transistor to allow the voltage at the node to be at the second level, the driver circuit being coupled to turn off the transistor to allow the voltage at the node to be at the first level.

5. The apparatus of claim 4 wherein the transistor-comprises an N-channel metal oxide semiconductor (MOS) transistor and wherein the driver circuit includes an inverter having an output terminal coupled to a gate terminal of the MOS transistor.

6. The apparatus of claim 1 wherein the switch comprises a transistor, and wherein the digital circuit comprises an AND gate having an enable signal and a data signal as input signals.

7. The apparatus of claim 1 wherein the switch comprises a transistor, and wherein the digital circuit comprises an inverter having a data signal as the input signal.

8. The apparatus of claim 1 wherein switch comprises a transistor, and wherein the digital circuit comprises and AND gate having an enable signal and a data signal as input signals.

9. A system, comprising:
a bus;
a termination impedance coupleable to the bus at a node; and
a control circuit to couple the termination impedance between a voltage source and the node if a voltage at the node is at a first level, the control circuit being capable to de-couple the termination impedance between the voltage source and the node if the voltage at the node is at a second level lower than the first level, wherein the termination impedance and the control circuit are disposed on a same die, wherein the control circuit comprises:
a switch coupled in a series with the termination impedance; and
a digital circuit having an output coupled to the switch to close or open the switch based on at least one input signal to the digital circuit.

10. The system of claim 9 wherein the control circuit is capable to couple the termination impedance between the voltage source and the node if an external signal is received at the node from the bus in a receive mode of operation.

11. The system of claim 9 wherein the bus comprises a Gunning Transceiver Logic-type bus.

12. The system of claim 9, further comprising:
another termination impedance coupleable to the bus at another node; and
another control circuit to couple the another termination impedance between the voltage source and the another node if a voltage at the another node is at the first level, the another control circuit being capable to de-couple the another termination impedance between the voltage source and the another node if the voltage at the another node is at a second level lower than the first level.

13. A method, comprising:
providing a termination impedance;
if a voltage at a node is at a first level, coupling the termination impedance between the node and a voltage source; and
if the voltage at the node is at a second level lower than the first level, de-coupling the termination impedance between the node and the voltage source, wherein the termination impedance and the control circuit are disposed on a same die, wherein coupling and de-coupling the termination impedance comprises:
serially coupling a switch to the termination impedance;
receiving at least one input signal at a digital circuit; and
outputting an output signal from the digital circuit to close or open the switch based on the input signal.

14. The method of claim 13, further comprising:
if a signal is received at the node from a bus coupled to the node in a receive mode of operation, coupling the termination impedance between the node and the voltage source.

15. The method of claim 13 wherein the switch comprises a transistor, wherein receiving the at least one input signal at the digital circuit comprises receiving a data signal and an enable signal at a logic gate, and wherein outputting the output signal comprises outputting the output signal from the logic gate, based on the data signal and the enable signal, to turn the transistor on or off.

16. The method of claim 13 wherein the switch comprises a transistor, wherein receiving the at least one input signal at the digital circuit comprises receiving a data signal and a reference voltage at a comparator circuit, and wherein outputting the output signal from the digital circuit comprises outputting the output signal from comparator circuit, based on whether the data signal exceeds or falls below the reference voltage, to respectively turn the transistor on or off.

17. An article of manufacture, comprising:
a machine-readable medium having instructions stored thereon to:
if a voltage at a node coupled to a bus is at a first level, couple a termination impedance between the node and a voltage source; and
if the voltage at the node is at a second level lower than the first level, de-couple the termination impedance between the node and the voltage source, wherein the termination impedance and the control circuit are disposed on a same die, wherein the instructions to couple and de-couple the termination impedance include instructions to cause output of an output signal from a digital circuit to close or open a switch, serially coupled to the termination impedance, based on at least one input signal received at the digital circuit.

18. The article of manufacture of claim 17, further comprising instructions stored on the machine-readable medium to couple the termination impedance between the node and the voltage source if a signal is received at the node from the bus in a receive mode of operation.

19. The article of manufacture of claim 17 wherein the switch comprises a transistor, wherein the at least one input signal received at the digital circuit comprises a data signal and an enable signal provided to a logic gate, and wherein output of the output signal comprises outputting the output signal from the logic gate, based on the data signal and the enable signal, to turn the transistor on or off.

20. An apparatus, comprising:
a termination impedance comprising a resistor having a resistance substantially matched with an impedance of a bus coupleable to a node; and
a control circuit to couple the termination impedance between a voltage source and the node if a voltage at the node is at a first level, the control circuit being capable to de-couple the termination impedance between the voltage source and the node if the voltage at the node is at a second level lower than the first level, wherein the control circuit comprises:
a switch coupled in series with the termination impedance; and
a digital circuit having an output terminal coupled to the switch to close or open the switch based on at least one input signal to the digital circuit.

21. The apparatus of claim 20 wherein the control circuit is capable to couple the termination impedance between the voltage source and the node if an external signal is received at the node in a receive mode of operation.

22. The apparatus of claim 20, further comprising:
a transistor having a first terminal coupled to the node, a second terminal coupled to ground, and a third terminal; and
a driver circuit having an output terminal coupled to the third terminal of the transistor, the driver circuit being coupled to turn on the transistor to allow the voltage at the node to be at the second level, the driver circuit being coupled to turn off the transistor to allow the voltage at the node to be at the first level.

23. The apparatus of claim 22 wherein the transistor comprises an N-channel metal oxide semiconductor (MOS) transistor and wherein the driver circuit includes an inverter having an output terminal coupled to a gate terminal of the MOS transistor.

24. The apparatus of claim 20 wherein the switch comprises a transistor, and wherein the digital circuit comprises an AND gate having an enable signal and a data signal as input signals.

25. The apparatus of claim 20 wherein the switch comprises a transistor, and wherein the digital circuit comprises an inverter having a data signal as the input signal.

26. The apparatus of claim 20 wherein the switch comprises a transistor, and wherein the digital circuit comprises a comparator circuit having a data signal and a reference voltage as the pair of input signals, the comparator circuit being coupled to turn off the transistor if the data signal is below the reference signal.

27. The apparatus of claim 20 wherein the termination impedance and the control circuit are disposed on a same die.

28. A system, comprising:
a bus;
a termination impedance coupleable to the bus at a node, the termination impedance comprising a resistor having a resistance substantially matched with an impedance of the bus; and
a control circuit to couple the termination impedance between a voltage source and the node if a voltage at the node is at a first level, the control circuit being capable to de-couple the termination impedance between the voltage source and the node if the voltage at the node is at a second level lower than the first level, wherein the control circuit comprises:
a switch coupled in series with the termination impedance; and
a digital circuit having an output coupled to the switch to close or open the switch based on at least one input signal to the digital circuit.

29. The system of claim 28 wherein the control circuit is capable to couple the termination impedance between the voltage source and the node if an external signal is received at the node from the bus in a receive mode of operation.

30. The system of claim 28 wherein the bus comprises a Gunning Transceiver Logic-type bus.

31. The system of claim 28, further comprising:
another termination impedance coupleable to the bus at another node; and
another control circuit to couple the another termination impedance between the voltage source and the another node if a voltage at the another node is at the first level, the another control circuit being capable to de-couple the another termination impedance between the voltage source and the another node if the voltage at the another node is at a second level lower than the first level.

32. A method, comprising:
providing a termination impedance comprising a resistor having a resistance substantially matched with an impedance of a bus coupleable to a node;
if a voltage at the node is at a first level, coupling the termination impedance between the node and a voltage source; and
if the voltage at the node is at a second level lower than the first level, de-coupling the termination impedance between the node and the voltage source, wherein coupling and de-coupling the termination impedance comprises:
serially coupling a switch to the termination impedance;
receiving at least one input signal at a digital circuit; and
outputting an output signal from the digital circuit to close or open the switch based on the input signal.

33. The method of claim 32, further comprising:
if a signal is received at the node from the bus coupled to the node in a receive mode of operation, coupling the termination impedance between the node and the voltage source.

34. The method of claim 32 wherein the switch comprises a transistor, wherein receiving the at least one input signal at the digital circuit comprises receiving a data signal and an enable signal at a logic gate, and wherein outputting the output signal comprises outputting the output signal from the logic gate, based on the data signal and the enable signal, to turn the transistor on or off.

35. The method of claim 32 wherein the switch comprises a transistor, wherein receiving the at least one input signal at the digital circuit comprises receiving a data signal and a reference voltage at a comparator circuit, and wherein outputting the output signal from the digital circuit comprises outputting the output signal from comparator circuit, based on whether the data signal exceeds or falls below the reference voltage, to respectively turn the transistor on or off.

36. An article of manufacture, comprising:
a machine-readable medium having instructions stored thereon to:
if a voltage at a node coupled to a bus is at a first level, couple a termination impedance between the node and a voltage source, the termination impedance comprising a resistor having a resistance substantially matched with an impedance of the bus; and
if the voltage at the node is at a second level lower than the first level, de-couple the termination impedance between the node and the voltage source, wherein the instructions to couple and de-couple the termination impedance include instructions to cause output of an output signal from a digital circuit to close or open a switch, serially coupled to the termination impedance, based on at least one input signal received at the digital circuit.

37. The article of manufacture of claim 36, further comprising instructions stored on the machine-readable medium to couple the termination impedance between the node and the voltage source if a signal is received at the node from the bus in a receive mode of operation.

38. The article of manufacture of claim 36 wherein the switch comprises a transistor, wherein the at least one input signal received at the digital circuit comprises a data signal and an enable signal provided to a logic gate, and wherein output of the output signal comprises outputting the output signal from the logic gate, based on the data signal and the enable signal, to turn the transistor on or off.

* * * * *